United States Patent
Cooper (10) Patent No.: US 6,775,992 B2
(45) Date of Patent: *Aug. 17, 2004

(54) DRY AIR INJECTION SYSTEM

(75) Inventor: Thomas L. Cooper, Kent City, MI (US)

(73) Assignee: Cooper Research, LLC, Kent City, MI (US)

( * ) Notice: Subject to any disclaimer, the term of this patent is extended or adjusted under 35 U.S.C. 154(b) by 188 days.

This patent is subject to a terminal disclaimer.

(21) Appl. No.: 10/035,632

(22) Filed: Oct. 26, 2001

(65) Prior Publication Data

US 2003/0084671 A1 May 8, 2003

(51) Int. Cl.$^7$ .................. F17C 13/00; F16L 9/18; F16L 11/00
(52) U.S. Cl. ............. 62/50.7; 62/93; 138/114
(58) Field of Search .......... 62/93, 50.7; 138/148, 138/149, 114

(56) References Cited

U.S. PATENT DOCUMENTS

| | | | |
|---|---|---|---|
| 2,572,062 A | | 10/1951 | Sexton |
| 2,592,574 A | | 4/1952 | Kaiser |
| 2,610,028 A | | 9/1952 | Smith |
| 2,836,963 A | * | 6/1958 | Fox .................. 137/209 |
| 3,151,633 A | | 10/1964 | Shuman |
| 3,213,889 A | | 10/1965 | Cotman, Jr. |
| 3,254,012 A | | 5/1966 | Ziegler |
| 3,319,431 A | | 5/1967 | Clarke et al. |
| 3,388,724 A | | 6/1968 | Mowell et al. |
| 3,410,313 A | | 11/1968 | Martin |
| 3,461,918 A | | 8/1969 | Gernet |
| 3,490,344 A | | 1/1970 | Archer et al. |
| 3,511,282 A | | 5/1970 | Willhite et al. |
| 3,547,161 A | | 12/1970 | Reece et al. |
| 3,717,718 A | | 2/1973 | Schmidtchen |
| 3,777,502 A | | 12/1973 | Michie, III et al. |
| 3,796,977 A | | 3/1974 | Elliot et al. |
| 3,831,636 A | | 8/1974 | Bittner |
| 3,866,670 A | | 2/1975 | Cramer et al. |
| 3,904,394 A | | 9/1975 | Prast et al. |
| 4,014,369 A | | 3/1977 | Kobres, Jr. |
| 4,130,140 A | | 12/1978 | Cerny et al. |
| 4,139,024 A | | 2/1979 | Adorjan |
| 4,194,536 A | | 3/1980 | Stine et al. |
| 4,279,270 A | | 7/1981 | Francis, Jr. |
| 4,303,105 A | | 12/1981 | Rohner |
| 4,492,088 A | * | 1/1985 | Ibrahim et al. .......... 62/50.7 |
| 4,715,187 A | | 12/1987 | Stearns |
| 4,803,787 A | * | 2/1989 | Amann ................ 34/557 |
| H594 H | | 3/1989 | Adorjan |
| 4,878,354 A | | 11/1989 | Stearns et al. |
| 4,924,679 A | | 5/1990 | Brigham et al. |
| 5,160,769 A | | 11/1992 | Garrett |
| 5,267,447 A | * | 12/1993 | Yamamoto .............. 62/50.7 |
| 5,291,741 A | | 3/1994 | Grimes |
| 5,307,639 A | | 5/1994 | Boissin |
| 5,400,602 A | | 3/1995 | Chang et al. |
| 6,070,413 A | * | 6/2000 | Ward ................ 62/50.7 |
| 2003/0079481 A1 | * | 5/2003 | Cooper ................ 62/50.7 |

FOREIGN PATENT DOCUMENTS

| | | |
|---|---|---|
| DE | 4135430 | 4/1993 |
| GB | 2040011 | 8/1980 |

* cited by examiner

*Primary Examiner*—William C. Doerrler
(74) *Attorney, Agent, or Firm*—Price, Heneveld, Cooper, DeWitt & Litton, LLP (57) ABSTRACT

A fluid transport system including a fluid transfer assembly, an air dryer and a tube. The fluid transfer assembly includes a pipe for transporting a cold fluid and a vapor barrier surrounding the pipe. The air dryer removes moisture in the air. The tube is connected to the air dryer and the fluid transfer assembly. The tube transfers air from the air dryer to the fluid transfer assembly at a plurality of points along a length of the fluid transfer assembly.

61 Claims, 5 Drawing Sheets

DRY AIR INJECTION SYSTEM

BACKGROUND OF THE INVENTION

The present invention relates to a cooling system for commercial freezers.

Cooling systems include a refrigeration system for cooling the temperature of a fluid and a pipe for transporting the fluid to an evaporator wherein the cold temperature of the fluid is transferred to the air surrounding the evaporator to cool the air surrounding the evaporator.

Heretofore, the coolant pipe coming from the refrigeration system has included insulation surrounding the pipe for maintaining the low temperature of the fluid within the pipe and for improving the efficiency of the cooling system. Furthermore, the insulation has included a vapor barrier surrounding the pipe and the insulation for keeping moisture in the air away from the pipe to prevent condensation of water on the outside surface of the pipe. When water condenses on the pipe, the pipe can experience varying growth and shrinking phases that can jeopardize the structural integrity of the pipe. If the pipe goes through too many phases, the pipe can leak, thereby greatly reducing the efficiency of the cooling system. Therefore, the pipe usually has to be replaced before the pipe can leak. Replacing the pipe, however, can be very expensive and will effectively shut down the freezer while the pipe is being replaced.

However, maintaining the integrity of the insulation and the vapor barrier is very difficult. Thousands of growth and shrinkage cycles due to temperature changes make maintaining vapor barrier integrity next to impossible. It is generally known that insulation in low temperature installations have a life of ten to fifteen years, with failures occurring within the first couple of years due to small failures in the vapor barrier.

Accordingly, an apparatus solving the aforementioned disadvantages is desired.

SUMMARY OF THE INVENTION

In the cooling apparatus and method of the present invention, dry air is injected into the space between the vapor barrier and the coolant pipe at a plurality of spaced points to evaporate liquid that has condescended on either the vapor barrier or the coolant pipe, thereby prolonging the life of the cooling apparatus.

The fluid transport system and the refrigeration system are efficient in use, economical to manufacture, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION OF THE PREFERRED EMBODIMENTS

Figure 1:
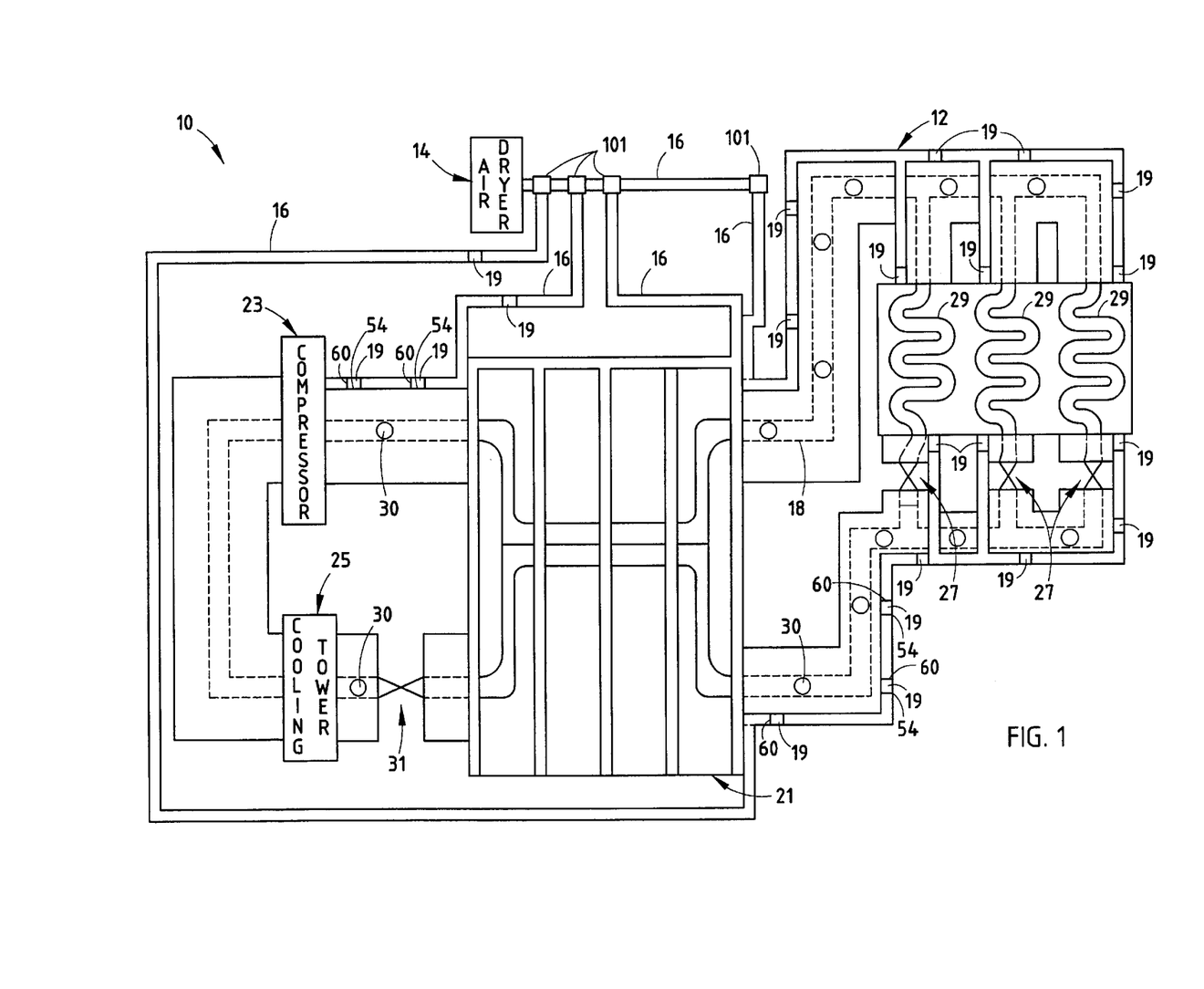
FIG. 1 is a schematic of a cooling system embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a fluid transport system of the present invention. In the illustrated example, the fluid transport system 10 includes a fluid transfer assembly 12, an air dryer 14 and a tube 16. The fluid transfer assembly 12 includes a pipe 18 for transporting a cold fluid and a vapor barrier 20 surrounding the pipe 18. The air dryer 14 removes moisture in the air. The tube 16 is connected to the air dryer 14 and the fluid transfer assembly 12. The tube 16 transfers air from the air dryer 14 to the fluid transfer assembly 12 at a plurality of points 19 along a length of the fluid transfer assembly 12.

In the illustrated example, the fluid transport system 10 is included in a cooling system 22 (FIG. 1). The cooling system 22 comprises a refrigeration cycle having a chiller 21, a compressor 23, a cooling tower or condenser 25, a plurality of expansion valves 27 and a plurality of evaporators 29. The cooling system 22 reduces the temperature of a commercial freezer 26 having the evaporators 29 therein. The cooling system 22 is preferably used to keep food in a supermarket cold. Therefore, the cooling system 22 can be used in a supermarket wherein shoppers or the staff of the supermarket can get cold food out of the commercial freezer 26. It is also contemplated that the cooling system 22 could be used to lower the temperature of any space wherein a cold air temperature is desired. The fluid flowing through the refrigeration system 24 and the fluid transfer assembly 12 can be any gas or liquid that has a temperature lower than the ambient temperature. The chiller 21 as described in this application can include any of the commercially available chillers sold by YORK International Corporation of York, Pa. The compressor 23, the cooling tower 25, the expansion valves 27 and the evaporators 29 are well known to those the skilled in the art. Those skilled in the art will appreciate that other similarly functioning refrigeration systems may be used.

In the illustrated cooling system 22, the cold fluid in the cooling system 22 flows to the commercial freezer 26 through the fluid transfer assembly 12 to lower the temperature in the commercial freezer 26, thereby keeping the food in the commercial freezer 26 cold. Initially, the fluid enters the compressor 23 and is compressed, typically into a gaseous state, by the compressor 23. The fluid thereafter leaves the compressor 23 in a heated state. The fluid will then enter the cooling tower 25, wherein the temperature of the fluid is lowered. Once the fluid leaves the cooling tower 25, the fluid can pass by a pressure relief valve 31 before entering the chiller 21. The chiller 21 is, among other things, a heat exchanger. The chiller 21 lowers the temperature of the fluid from the cooling tower 25 by transferring heat from the fluid coming from the cooling tower 25 to a colder fluid entering the compressor 23. The fluid then continues to the expansion valves 27, wherein the temperature of the fluid is reduced before the fluid enters the evaporators 29 within the commercial freezer 26. Once the fluid leaves the evaporators 29, the fluid travels through the chiller 21 once again to absorb some of the heat of the fluid in the line between the cooling tower 25 and the expansion valves 27, as discussed above. The fluid then enters the compressor 23 to start the cooling process over again.

The illustrated fluid transfer assembly 12 (FIGS. 2–3) includes the pipe 18 for transporting the cold fluid, insulation 28 surrounding the pipe 18 and the vapor barrier 20 surrounding the pipe 18 and the insulation 28. The pipe 18 is preferably cylindrical and made of carbon steel or stainless steel. Furthermore, the insulation is preferably made of any commercially available insulation (e.g., STYROFOAM). The vapor barrier 20 is also cylindrical and is commercially available from MFM Building Products Corporation located in Coshocton, Ohio, under the commercial name Flex Clad/I30. In a preferred embodiment, the tube 16 is located adjacent the interior surface of the vapor barrier 20 and the insulation 28 fills the remaining space 56 between the pipe 18 and the vapor barrier 20.

Figure 2:
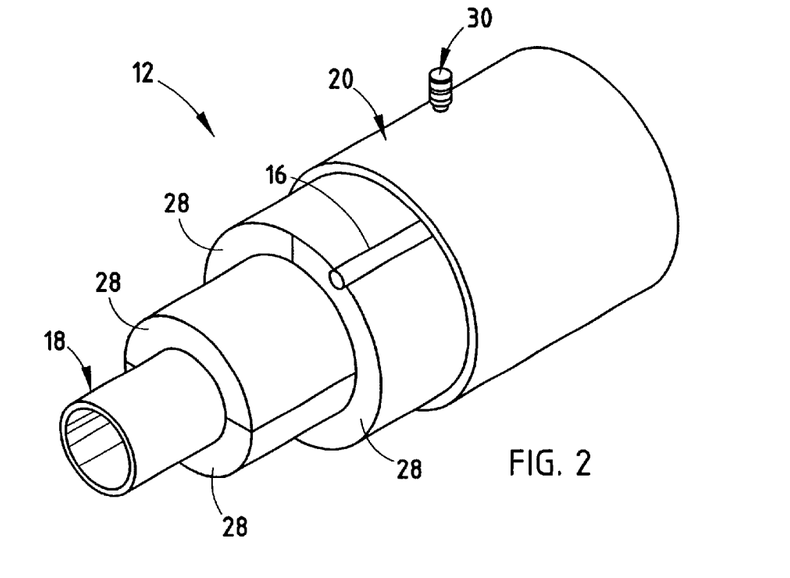
FIG. 2 is a perspective cut-away view of a fluid transfer assembly of the present invention.
Figure 3:
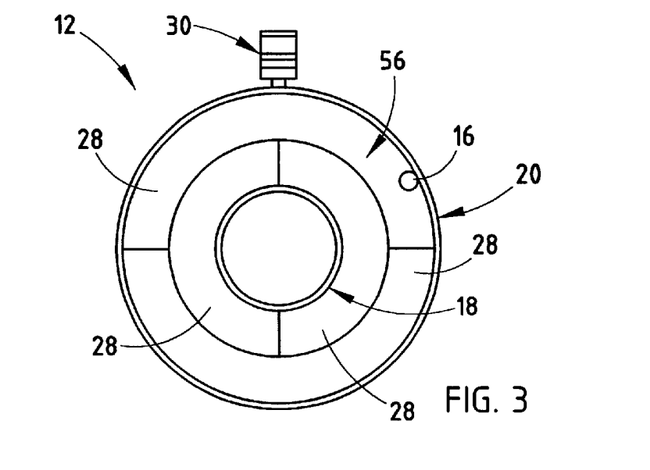
FIG. 3 is a cross-section view of the fluid transfer assembly of the present invention.

In the illustrated example, the tube 16 is connected to the air dryer 14 and extends though areas of the fluid transfer assembly 12 having cold fluid within the pipe 18. The tube 16 preferably splits into four parts and enters the fluid transfer assembly 12 located between the chiller 21 and the compressor 23, between the chiller 21 and the evaporators 29, between the evaporators 29 and the chiller 21 and within the chiller 21. Preferably, a flow meter 101 is located at each of the splits in the tube 16 to ensure that the flow in each of the four parts of the tube 16 is equal. The air dryer 14 includes a system for removing moisture in the air and for lowering the dew point of the air. The air dryer 14 as described in this application is commercially available from Hankison located in Canonsburg, Pa., under the commercial name DHW-25. Those skilled in the art will appreciate that other similarly functioning air dryers may be used. The tube 16 is preferably cylindrical and made of nylon. The tube 16 includes a plurality of openings 54 located at each of the points 19 and preferably spaced equidistant from each other. The dry air entering the tube 16 from the air dryer 14 is injected though the openings 54 and into the space 56 between the vapor barrier 20 and the pipe 18 for removing the moisture in the space 56 between the vapor barrier 20 and the pipe 18.

Figure 4:
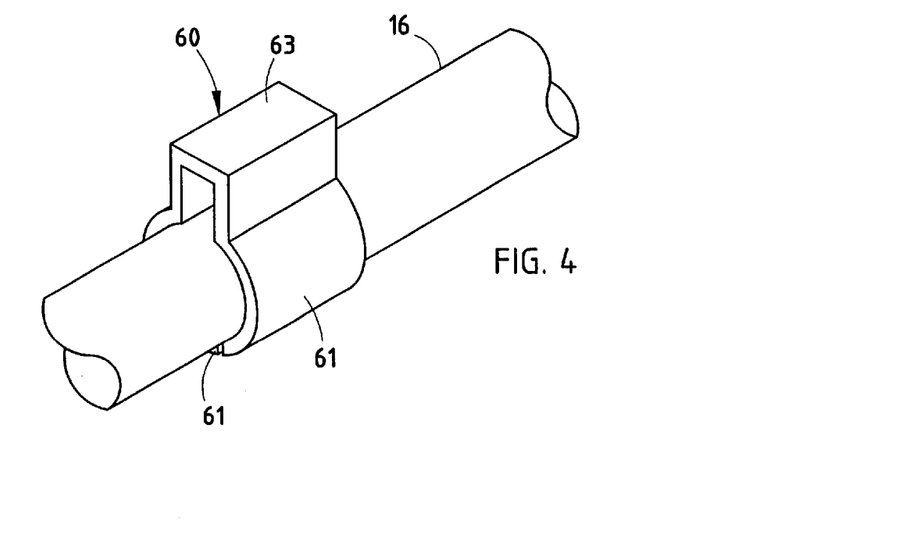
FIG. 4 is a perspective view of a tube with nozzle sleeves of the fluid transfer assembly of the present invention.

The illustrated tube 16 preferably includes a clip 60 (FIG. 4) surrounding each opening 54. The clips 60 have a skeleton key keyhole cross-section and include a pair of semi-circular clip sections 61 and a U-shaped covering wall 63 spaced from the opening 54 for providing a clear passageway for dry air exiting the opening 54. The covering wall 63 also prevents the insulation from entering the openings 54 and thereby prevents the insulation 28 from blocking the flow of dry air into the space 56 between the pipe 18 and the vapor barrier 20.

In operation of the fluid transfer assembly 10, the dry air entering the space 56 between the pipe 18 and the vapor barrier 20 from the tube 16 will absorb any water on the pipe 18 or the vapor barrier 20 produced through condensation. Water on the pipe 18 and vapor barrier 20 as a result of condensation will cause the pipe 18 and/or the vapor barrier 20 to shrink, thereby reducing the lifetime of the pipe 18 and the vapor barrier 20. With the dry air entering the fluid transfer assembly 12, the pipe 18 and the vapor barrier 20 can have an expected lifetime of 5 to 10 times longer than a pipe 18 and vapor barrier 20 without any injection of dry air. Furthermore, with the dry air entering the space 56 at the plurality of points 19 along the fluid transfer assembly 12, the entire length of the pipe 18 and the vapor barrier 20 will have any water on the pipe 18 and vapor barrier 20 evaporated therefrom, as discussed above, to extend the life of the entire length of the pipe 18 and the vapor barrier 20. If the dry air only entered at the ends of the fluid transfer assembly 12, only the life of the ends of the pipe 18 and the vapor barrier 20 would be extended. An example of the number of openings 54, the spacing of the openings 54 and the size of the openings 54 for a pipe 18 of 351 feet and a ⅜ inch tube 12 is shown in Table 1. Consequently, the pipe 18 and the vapor barrier 20 will not have to be replaced as frequently as a pipe and vapor barrier without dry air injected into the space 56 between the pipe and vapor barrier.

TABLE 1

| HOLE | LOCATION (IN FEET) | OPENING SIZE (BASED ON STANDARD ENGLISH DRILL DIAMETER) |
|---|---|---|
| 1 | 0 | 79 |
| 2 | 9 | 79 |
| 3 | 18 | 79 |
| 4 | 27 | 79 |
| 5 | 36 | 79 |
| 6 | 45 | 1/64 |
| 7 | 54 | 1/64 |
| 8 | 63 | 1/64 |
| 9 | 72 | 1/64 |
| 10 | 81 | 1/64 |
| 11 | 90 | 78 |
| 12 | 99 | 78 |
| 13 | 108 | 78 |
| 14 | 117 | 78 |
| 15 | 126 | 77 |
| 16 | 135 | 77 |
| 17 | 144 | 77 |
| 18 | 153 | 77 |
| 19 | 162 | 77 |
| 20 | 171 | 77 |
| 21 | 180 | 77 |
| 22 | 189 | 77 |
| 23 | 198 | 77 |
| 24 | 207 | 77 |
| 25 | 216 | 77 |
| 26 | 225 | 77 |
| 27 | 234 | 77 |
| 28 | 243 | 77 |
| 29 | 252 | 77 |
| 30 | 261 | 77 |
| 31 | 270 | 77 |
| 32 | 279 | 77 |
| 33 | 288 | 77 |
| 34 | 297 | 77 |
| 35 | 306 | 77 |
| 36 | 315 | 77 |
| 37 | 324 | 77 |
| 38 | 333 | 77 |
| 39 | 342 | 77 |
| 40 | 351 | 77 |

In the preferred embodiment, the fluid transport system 10 also includes a plurality of check valves 30 (FIG. 5) located along the length of the fluid transfer assembly 12. The check valves 30 are connected to the vapor barrier 20 and allow air to escape the space 56 between the pipe 18 and the vapor barrier 20. Preferably, the check valves 30 are located equidistant apart from each other and equally spaced between each of the openings 54 in the tube 16. Each check valve 30 preferably includes a nylon reducing nipple 70 inserted into the vapor barrier 18, a nylon coupling 72 connected to the nipple 70, a nylon plug 74 connected to the nylon coupling 72 and a nylon ball 76 located between the nylon coupling 72 and the nylon plug 74. The nipple 70, coupling 72 and plug 74 each have an aligned aperture 75 to create a fluid path through the check valve 30. The ball 76 is located in a semi-spherical bowl (not shown) in the upper portion of the coupling 72. The aligned apertures of the nipple 70, coupling 72 and plug 74 are vertically arranged such that gravity forces the ball 76 downward to close off the fluid path in the check valve 30. When the pressure of the air in the space 56 between the pipe 18 and the vapor barrier 20 rises above a certain level, the ball 76 will lift to allow the air in the space between the pipe 18 and the vapor barrier 20 to escape through an aperture 73 in the nylon coupling 72. The check valve 30 as described directly above is known to those skilled in the art. Additionally, those skilled in the art will appreciate that other similarly functioning check valves can be used.

Figure 5:
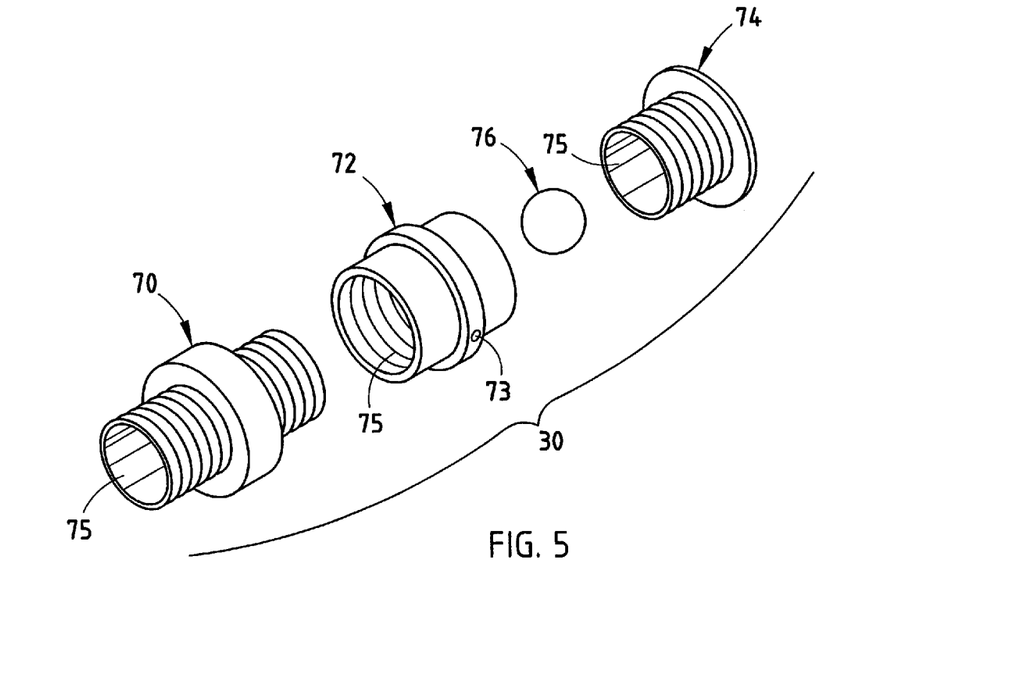
FIG. 5 is an exploded view of a check valve of the present invention.

In operation, the check valves 30 preferably allow the air in the space 56 between the pipe 18 and the vapor barrier 20 to remain at atmospheric pressure. Therefore, as the dry air is injected into the space 56 between the pipe 18 and the vapor barrier 20, an equal amount of air will escape the space 56 between the pipe 18 and the vapor barrier 20 though the check valves 30 and into the atmosphere. Consequently, the air in the space 56 between the pipe 18 and the vapor barrier 20 will have a lower dew point than the atmospheric air. Accordingly, the dry air injected into the space 56 between the pipe 18 and the vapor barrier 20 will continuously remove any moisture in the space 56 between the pipe 18 and the vapor barrier 20, thereby improving the life span of the pipe 18 and the vapor barrier 20. Preferably, all of the check valves 30 have the plug 74 and the ball 76 removed and a flow meter is inserted into the nylon coupling 72 to check the flow of the air out of the space 56 between the pipe 18 and the vapor barrier 20 to assure that the air flow for each of the check valve 30 locations is substantially equal.

Figure 6:
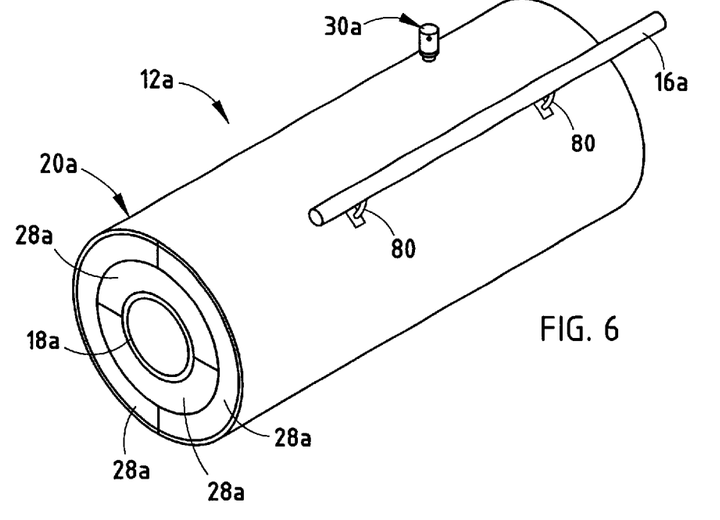
FIG. 6 is a perspective cut-away view of a fluid transfer assembly of a second embodiment of the present invention.
Figure 7:
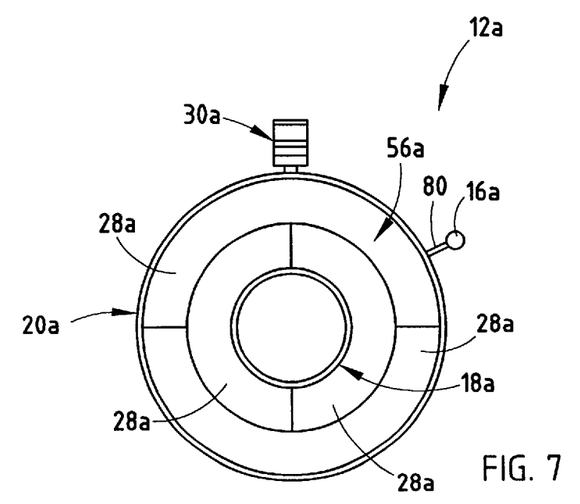
FIG. 7 is a cross-section view of the fluid transfer assembly of the second embodiment of the present invention.

The reference numeral 10a (FIGS. 6 and 7) generally designates a second preferred embodiment of the invention, having a second preferred embodiment of the fluid transport system. Since fluid transport system 10a is similar to the previously described fluid transport system 10, similar parts appearing in FIGS. 2–3 and FIGS. 6–7, respectively, are represented by the same, corresponding reference numeral, except for the suffix "a" in the numerals of the latter. The fluid transport system 10a includes a tube 16a exterior to the vapor barrier 20. The tube 16a extends parallel to an outside surface of the vapor barrier 20a and includes a plurality of conduits 80 that extend from the tube 16a through the vapor barrier 20a at the plurality of points 19a. The dry air from the air dryer 14 is therefore transferred from the air dryer 14 to the fluid transfer assembly 12a through the tube 16a and the conduits 80. The conduits 80 are preferably spaced equidistant along the length of the fluid transfer assembly 12a and equidistant between each check valve 30a.

Figure 8:
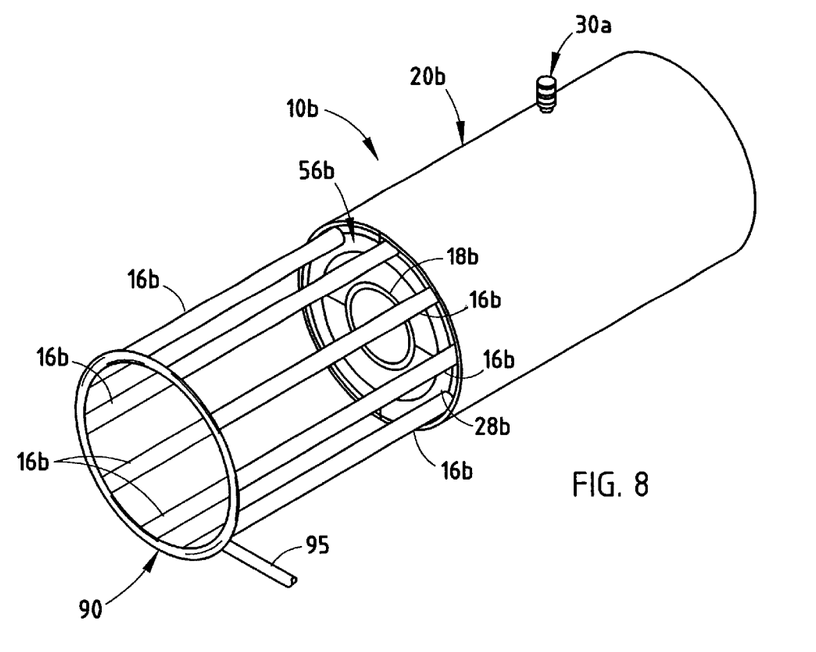
FIG. 8 is a perspective cut-away view of a fluid transfer assembly of a third embodiment of the present invention.

The reference numeral 10b (FIG. 8) generally designates a third preferred embodiment of the invention, having a second preferred embodiment of the fluid transport system. Since fluid transport system 10b is similar to the previously described fluid transport system 10, similar parts appearing in FIG. 2 and FIG. 8, respectively, are represented by the same, corresponding reference numeral, except for the suffix "b" in the numerals of the latter. The fluid transport system 10b includes a plurality of tubes 16a in the fluid transfer assembly 12b. The fluid transport system 10b includes an annular supply header 90 fluidly connected to each of the tubes 16b and the air dryer 14b. The supply header 90 is preferably located within the refrigeration system 22b adjacent the outlet port 50b. In operation, dry air coming from the air dryer 14b is forced through a connection tube 95 connecting the air dryer 14b and the supply header 90b. The supply header 90 thereafter separates the dry air into a plurality of flow paths, with each flow path located through each tube 16b. Consequently, the tubes 16b will each inject air into the space 56b between the pipe 18b and the vapor barrier 20b at each point 19 through the openings 54b. Although the supply header 90 is shown as being used with the tube 16 that is within the fluid transfer assembly 12, it is contemplated that the supply header 90 could also be used to supply dry air to a plurality of tubes 16 located exterior of the fluid transfer assembly 12 as discussed in the second preferred embodiment of the invention. The third embodiment of the fluid transport system 10b is preferably used with very large pipes 18 or in the insulation of a closed vessel (e.g., the chiller 21). The number of tubes 16 in the third embodiment of the fluid transport system 10b varies depending on the area of insulation and the length of the pipe 18.

In the forgoing description, it will be readily appreciated by those skilled in the art that modifications may be made to the invention without departing from the concepts disclosed herein. Such modifications are to be considered as included in the following claims, unless these claims by their language expressly state otherwise.

I claim:

1. A fluid transport system comprising:
   a fluid transfer assembly including a pipe for transporting a cold fluid and a vapor barrier surrounding the pipe;
   an air dryer for removing moisture in air; and
   a tube connected to the air dryer and the fluid transfer assembly;
   wherein the tube transfers air from the air dryer to the fluid transfer assembly at a plurality of points along a length of the fluid transfer assembly.

2. The fluid transport system of claim 1, wherein:
   the tube is located between the vapor barrier and the pipe; and
   the tube includes a plurality of openings located at the plurality of points for transferring the air from the air dryer into an area between the vapor barrier and the pipe.

3. The fluid transport system of claim 2, wherein:
   at least a portion of the vapor barrier is spaced from the pipe; and
   insulation is located between the portion of the vapor barrier and the pipe.

4. The fluid transport system of claim 2, further including:
   a clip surrounding the tube adjacent each opening, the clip including a covering wall spaced from the opening for providing a clear passageway for dry air exiting the opening.

5. The fluid transport system of claim 1, wherein:
   the tube is located outside of the vapor barrier.

6. The fluid transport system of claim 5, wherein:
   the tube includes a plurality of conduits connected to an outside surface of the vapor barrier at the plurality of points; and the air is transferred from the air dryer to the fluid transfer assembly through the tube and the conduits.

7. The fluid transport system of claim 6, wherein:

the vapor barrier is spaced from the pipe;

insulation is located between the vapor barrier and the pipe.

8. The fluid transport system of claim 1, further including:

at least one check valve connected to the vapor barrier of the fluid transfer assembly for allowing air to escape from the vapor barrier.

9. The fluid transport system of claim 8, wherein:

the plurality of points are spaced equidistant along the length of the fluid transfer assembly.

10. The fluid transport system of claim 9, wherein:

the at least one check valve includes a plurality of check valves, each check valve being located between a pair of adjacent points.

11. The fluid transport system of claim 1, wherein:

the plurality of points are spaced equidistant along the length of the fluid transfer assembly.

12. A method of insulating a fluid transfer assembly having a pipe for transporting a cold fluid and a vapor barrier surrounding the pipe, the method comprising:

removing moisture from air with an air dryer; and connecting a tube to the air dryer and the fluid transfer assembly; and injecting air from the air dryer into the fluid transfer assembly through the tube at a plurality of points along a length of the fluid transfer assembly.

13. The method of insulating a fluid transfer assembly of claim 12, further including:

locating the tube between the vapor barrier and the pipe of the fluid transfer assembly;

providing the tube with a plurality of openings;

wherein the step of injecting air includes injecting air through the plurality of openings at the plurality of points.

14. The method of insulating a fluid transfer assembly of claim 13, further including:

spacing the vapor barrier from the pipe;

placing insulation between the vapor barrier and the pipe.

15. The method of insulating a fluid transfer assembly of claim 13, further including:

surrounding the tube with a clip adjacent each opening, the clip including a covering wall spaced from the opening for allowing the dry air to be injected into the fluid transfer assembly.

16. The method of insulating a fluid transfer assembly of claim 12, further including:

locating the tube outside of the vapor barrier.

17. The method of insulating a fluid transfer assembly of claim 12, further including:

providing the tube with a plurality of conduits; and connecting the plurality of conduits to an outside surface of the vapor barrier at the plurality of points;

wherein the step of injecting air includes injecting air from the air dryer and into the fluid transfer assembly through the tube and the conduits.

18. The method of insulating a fluid transfer assembly of claim 17, further including:

spacing at least a portion of the vapor barrier from the pipe; and placing insulation between the portion of the vapor barrier and the pipe.

19. The method of insulating a fluid transfer assembly of claim 12, further including:

connecting at least one check valve to the vapor barrier of the fluid transfer assembly; and removing air from the fluid transfer assembly through the check valve, whereby the air in the fluid transfer assembly can maintain a low dew point.

20. The method of insulating a fluid transfer assembly of claim 19, further including:

locating the plurality of points at equidistant locations along the length of the fluid transfer assembly.

21. The method of insulating a fluid transfer assembly of claim 20, wherein:

the step of connecting at least one check valve to the vapor barrier includes connecting a plurality of check valves to the vapor barrier, each check valve being located between a pair of the plurality of points.

22. The method of insulating a fluid transfer assembly of claim 12, further including:

locating the plurality of points at equidistant locations along the length of the fluid transfer assembly.

23. A cooling system comprising:

a fluid transfer assembly including a pipe for transporting a cold fluid, insulation surrounding the pipe and a vapor barrier surrounding the insulation and the pipe;

an air dryer for removing moisture in the air to thereby create air with a dew point lower than the dew point of moist air located within the fluid transfer assembly;

a tube connected to the air dryer and the fluid transfer assembly; and a plurality of check valves connected to the vapor barrier;

wherein the air with the dew point lower than the dew point of moist air is transferred from the air dryer to a space between the pipe and the vapor barrier of the fluid transfer assembly at a plurality of points along a length of the fluid transfer assembly by the tube, and the check valve allows the air in the space between the pipe and the vapor barrier to escape the space, thereby removing moisture from the space.

24. The cooling system of claim 23, wherein:

the tube extends through the vapor barrier and into the space between the vapor barrier and the pipe; and the tube includes a plurality of openings located at the plurality of points for transferring the air with the dew point lower than the dew point of the moist air from the air dryer into the space between the vapor barrier and the pipe.

25. The cooling system of claim 24, further including:

a clip surrounding the tube adjacent each opening, the clip including a covering wall spaced from the opening for providing a clear passageway for dry air exiting the opening.

26. The cooling system of claim 23, wherein:

the tube is located outside of the vapor barrier.

27. The cooling system of claim 26, wherein:

the tube includes a plurality of conduits connected to an outside surface of the vapor barrier at the plurality of points; and the air with the dew point lower than the dew point of the moist air is transferred from the air dryer to the fluid transfer assembly through the tube and the conduits.

28. The cooling system of claim 23, wherein:

the plurality of points are spaced equidistant along the length of the fluid transfer assembly.

29. The cooling system of claim 23, wherein:
each check valve is located between a pair of adjacent points.

30. A fluid transport system comprising:
a fluid transfer assembly including a pipe for transporting a cold fluid and a vapor a barrier surrounding the pipe;
a supply of dry gas; and
a tube connected to the supply of dry gas and the fluid transfer assembly;
wherein the tube transfers dry gas from the supply of dry gas to the fluid transfer assembly at a plurality of points along a length of the fluid transfer assembly.

31. The fluid transport system of claim 30, wherein:
the tube is located between the vapor barrier and the pipe; and
the tube includes a plurality of openings located at the plurality of points for transferring the dry gas from the supply of dry gas into an area between the vapor barrier and the pipe.

32. The fluid transport system of claim 31, wherein:
at least a portion of the vapor barrier is spaced from the pipe; and
insulation is located between the portion of the vapor barrier and the pipe.

33. The fluid transport system of claim 31, further including:
a clip surrounding the tube adjacent each opening, the clip including a covering wall spaced from the opening for providing a clear passageway for dry gas exiting the opening.

34. The fluid transport system of claim 30, wherein:
the tube is located outside of the vapor barrier.

35. The fluid transport system of claim 34, wherein:
the tube includes a plurality of conduits connected to an outside surface of the vapor barrier at the plurality of points; and
the dry gas is transferred from the supply of dry gas to the fluid transfer assembly through the tube and the conduits.

36. The fluid transport system of claim 35, wherein:
the vapor barrier is spaced from the pipe;
insulation is located between the vapor barrier and the pipe.

37. The fluid transport system of claim 30, further including:
at least one check valve is connected to the vapor barrier of the fluid transfer assembly for allowing gas to escape from the vapor barrier.

38. The fluid transport system of claim 37, wherein:
the plurality of points are spaced equidistant along the length of the fluid transfer assembly.

39. The fluid transport system of claim 38, wherein:
the at least one check valve includes a plurality of check valves, each check valve being located between a pair of adjacent points.

40. The fluid transport system of claim 30, wherein:
the plurality of points are spaced equidistant along the length of the fluid transfer assembly.

41. The fluid transport system of claim 30, wherein:
the supply of dry gas comprises an air dryer for removing moisture in air to provide dry air; and
the dry gas is the dry air provided by the air dryer.

42. A method of insulating a fluid transfer assembly having a pipe for transporting a cold fluid and a vapor barrier surrounding the pipe, the method comprising:
supplying dry gas; and
connecting a tube to the supply of dry gas and the fluid transfer assembly; and
injecting dry gas from the supply of dry gas into the fluid transfer assembly through the tube at a plurality of points along a length of the fluid transfer assembly.

43. The method of insulating a fluid transfer assembly of claim 42, further including:
locating the tube between the vapor barrier and the pipe of the fluid transfer assembly;
providing the tube with a plurality of openings;
wherein the step of injecting dry gas includes injecting dry gas through the plurality of openings at the plurality of points.

44. The method of insulating a fluid transfer assembly of claim 43, further including:
spacing the vapor barrier from the pipe;
placing insulation between the vapor barrier and the pipe.

45. The method of insulating a fluid transfer assembly of claim 43, further including:
surrounding the tube with a clip adjacent each opening, the clip including a covering wall spaced from the opening for allowing the dry gas to be injected into the fluid transfer assembly.

46. The method of insulating a fluid transfer assembly of claim 42, further including:
locating the tube outside of the vapor barrier.

47. The method of insulating a fluid transfer assembly of claim 42, further including:
providing the tube with a plurality of conduits; and
connecting the plurality of conduits to an outside surface of the vapor barrier at the plurality of points;
wherein the step of injecting dry gas includes injecting dry gas into the fluid transfer assembly through the tube and the conduits.

48. The method of insulating a fluid transfer assembly of claim 47, further including:
spacing at least a portion of the vapor barrier from the pipe; and
placing insulation between the portion of the vapor barrier and the pipe.

49. The method of insulating a fluid transfer assembly of claim 42, further including:
connecting at least one check valve to the vapor barrier of the fluid transfer assembly; and
removing gas from the fluid transfer assembly through the check valve, whereby the gas in the fluid transfer assembly can maintain a low dew point.

50. The method of insulating a fluid transfer assembly of claim 49, further including:
locating the plurality of points at equidistant locations along the length of the fluid transfer assembly.

51. The method of insulating a fluid transfer assembly of claim 50, wherein:
the step of connecting at least one check valve to the vapor barrier including connecting a plurality of check valves to the vapor barrier, each check valve being located between a pair of points.

52. The method of insulating a fluid transfer assembly of claim 42, further including:
locating the plurality of points at equidistant locations along the length of the fluid transfer assembly.

53. The method of insulating a fluid transfer assembly of claim 42, wherein:

the step of supplying dry gas includes removing moisture from air with an air dryer.

54. A cooling system comprising:

a fluid transfer assembly including a pipe for transporting a cold fluid, insulation surrounding the pipe and a vapor barrier surrounding the insulation and the pipe;

a supply of dry gas to thereby have gas with a dew point lower than the dew point of moist air located within the fluid transfer assembly;

a tube connected to the supply of dry gas and the fluid transfer assembly; and a plurality of check valves connected to the vapor barrier;

wherein the dry gas with the dew point lower than the dew point of moist air is transferred from the supply of dry gas to a space between the pipe and the vapor barrier of the fluid transfer assembly at a plurality of points along a length of the fluid transfer assembly by the tube, and the check valve allows the gas in the space between the pipe and the vapor barrier to escape the space, thereby removing moisture from the space.

55. The cooling system of claim 54, wherein:

the tube extends through the vapor barrier and into the space between the vapor barrier and the pipe; and the tube includes a plurality of openings located at the plurality of points for transferring the gas with the dew point lower than the dew point of the moist air from the supply of dry gas into the space between the vapor barrier and the pipe.

56. The cooling system of claim 55, further including:

a clip surrounding the tube adjacent each opening, the clip including a covering wall spaced from the opening for providing a clear passageway for dry gas exiting the opening.

57. The cooling system of claim 54, wherein:

the tube is located outside of the vapor barrier.

58. The cooling system of claim 57, wherein:

the tube includes a plurality of conduits connected to an outside surface of the vapor barrier at the plurality of points; and the gas with the dew point lower than the dew point of the moist air is transferred from the supply of dry gas to the fluid transfer assembly through the tube and the conduits.

59. The cooling system of claim 54, wherein:

the plurality of points are spaced equidistant along the length of the fluid transfer assembly.

60. The cooling system of claim 54, wherein:

each check valve is located between a pair of adjacent points.

61. The cooling system of claim 54, wherein:

the supply of dry gas comprises an air dryer for removing moisture in air to provide dry air; and the dry gas is the dry air provided by the air dryer.

* * * * *

UNITED STATES PATENT AND TRADEMARK OFFICE
CERTIFICATE OF CORRECTION

PATENT NO. : 6,775,992 B2
DATED : August 17, 2004
INVENTOR(S) : Thomas L. Cooper It is certified that error appears in the above-identified patent and that said Letters Patent is hereby corrected as shown below:

<u>Column 9,</u>
Line 6, after "vapor" delete "a".

<u>Column 10,</u>
Line 59, "including" should read -- includes --.

Signed and Sealed this

Fourth Day of January, 2005

JON W. DUDAS
*Director of the United States Patent and Trademark Office*